United States Patent Office

3,440,001
Patented Apr. 22, 1969

---

3,440,001
PRINTING OF POLYETHYLENE TEREPHTHALATE FABRICS
Gabor J. Szilagyi, Charlotte, N.C., assignor to Celanese Corporation, a corporation of Delaware
No Drawing. Filed Aug. 27, 1964, Ser. No. 392,632
Int. Cl. D06p 3/00, 5/02
U.S. Cl. 8—62    9 Claims

---

ABSTRACT OF THE DISCLOSURE

A printing process for polyethylene terephthalate fabric comprising printing on the fabric an aqueous paste containing a disperse dye, a thickening agent and an oxyethylated fatty alcohol and then heating the fabric to fix the print.

---

This invention relates to a printing process, and more particularly, to an improved process for the production of patterned effects on polyethylene terephthalate fabrics.

In the print dyeing of polyethylene terephthalate fabrics, especially those fabrics containing 100 percent polyethylene terephthalate, the difficulties of maintaining the desirable properties of the prints for increased fastness to crocking, laundering and dry cleaning, are well known in the art. To attain printing on polyethylene terephthalate fabrics, expensive dye assistants or carriers used widely in the art are required to produce the prints. When the dye assistants or carriers are utilized, it is generally the normal procedure especially for 100 percent polyethylene terephthalate fabrics to utilize an expensive, discontinuous steaming operation followed by a subsequent heat setting step.

It is the object of this invention to provide an improved process for printing polyethylene terephthalate fabrics with disperse dyes. An additional object is to provide a continuous process for high quality and desirable printing of polyethylene terephthalate fabrics, especially fabrics containing 100 percent polyethylene terephthalate fabrics. These and other objects will become apparent to those skilled in the art by reading the following detailed disclosure.

The objects of the invention can be attained for coloring a polyethylene terephthalate fabric by printing with an aqueous paste having the suitable printing consistency and containing a desirable disperse dye, thickening agent and a specific type of additive. The additive ingredient of the paste as used in this invention is an oxyethylated fatty alcohol having the formula

$$R\text{—}CH_2O(C_2H_4O)_n\text{—}C_2H_4OH$$

wherein R represents an alkyl radical containing from about 6 to 20 carbon atoms and $n$ represents an integer from 1 to 20. The amounts of oxyethylated fatty alcohol as used herein can range from about 1 to about 8 percent by weight of the paste. The thickening agent which can be used to obtain the paste consistency can include such alginates (e.g. the alginate sold under the name "Keltex") and modified locust bean gum (e.g. the modified gum sold under the name "Itagum R10") are very suitable. Materials such as British gum starches, gum karaya, gum tragacanth and gum arabic are much less desirable for this purpose. The amount of thickening agent used is sufficient to impart to the mixture the known relatively high viscosity of a printing paste. A suitable concentration of thickener is, for example, 2 to 8 percent by weight based on the printing paste, depending on the type and method of application. The remaining components of the paste are the dispersed dye and the remainder water.

A preferred embodiment of the invention relates to the process for the production of patterned effects on a polyethylene terephthalate fabric by printing with an aqueous paste having the suitable printing consistency and containing a desirable disperse dye and specific type of emulsion thickener. One of the components of the emulsion thickener which is utilized is composed of about 2 to about 8 weight percent of an oxyethylated fatty alcohol as described above. An additional essential component of the emulsion thickener in amounts ranging from about 52 to about 78 percent by weight is a wholly or substantially wholly volatile hydrocarbon liquid such as kerosene or other fractions of petroleum, aromatic or naphthenic hydrocarbons, for example, toluene, xylenes and the like or mixtures thereof. Water in amounts from about 20 to about 40 weight percent of the emulsion thickener is a further essential component. The print paste is applied to the fabric followed by fixing of the dyes in sharp and distinct prints at elevated temperatures within a relatively short period of time. The fixing times of the prints can range anywhere from 10 seconds to 20 minutes, if desired, in the process of this invention. It should be readily apparent that the process as utilized above can provide a continuous system of printing polyethylene terephthalate fabrics, especially 100 percent polyethylene terephthalate fabrics.

The fabrics which are suitable for use in the process of this invention are any type containing polyethylene terephthalate in substantial amounts, i.e. in excess of 30 percent. For example, a blend of polyethylene terephthalate with cotton, wool, other synthetic fibers such as nylon, acetate, acrylics, and the like, can be utilized.

The invention is applicable generally to printing the polyethylene terephthalate (polyester) fabrics with disperse dyestuffs that show an affinity for the polyester fabrics when applied to said fabric and heat treated. However, when the heat treatment is carried out using dry heat, care should be taken to avoid the use of those dyestuffs that will sublime under the conditions of the heat treatment in order to retain the sharpness of the printed design. After heat treatment, the printed fabric shows little or no color loss and substantially no staining when washed, even at temperatures as high as 160° F. Because of the absence of staining, the fabric is suitable for commercial use even when there is some wash down of the dyestuffs.

Examples of suitable dispersed dyestuffs are such compounds as 2 - nitro - 4 - sulfonanilido diphenylamine, 4'-ethoxy - 2 - nitrodiphenylamine-β-hydroxypropylsulfonamide, 4-nitro-2-methoxyphenol azo 4'-bis(beta-hydroxyethyl) amino-2'-acetylaminobenzene, 4-nitro - 2 - methylsulfonephenyl azo 4'-(N-beta-hydroxy-ethyl-N-difluoroethyl) aminobenzene, 4-nitro-2-chlorophenyl azo 4'-bis-(beta-hydroxy-ethyl) amino-2'-methylbenzene, 1-hydroxyethylamino-4-hydroxy - ethylamino-5-hydroxy-8-hydroxy anthraquinone, 4-nitrophenyl azo 4'-di-β-hydroxyethylamino-2'-acetaminobenzene, a mixture of 1,4-di-(hydroxyethylamino)-5,8-dihydroxy anthraquinone and 1-amino-4-anilido anthraquinone, 1,5 - dihydroxy-8-nitro-4-(meta-alpha-hydroxyethyl) anilido anthraquinone, 1,8 - dihydroxy-4-(para-beta-hydroxyethyl) anilido-5-nitro anthraquinone, 1-amino-4-anilido anthraquinone, 2-nitro-4-sulfonamido diphenylamine, p-nitrophenyl azo diethyl aniline, 1-amino-4-hydroxy anthraquinone and 2,4-dinitro-6-chlorophenyl azo 4'-bis (hydroxyethyl) amino-2'-acetylamino-5'-methoxy benzene, and the like, and mixtures thereof.

The amount of dye used in the printing paste will vary in accordance with the depth of color desired. Suitable proportions can range from about 0.1 to about 15 percent by weight based on the weight of the printing paste.

The printing paste as used with the emulsion thickener, i.e. an oil-in-water thickened emulsion has a proportion of water in excess of about 30 percent by weight. Therefore, the emulsion thickener in the printing paste can not be in excess of 70 percent by weight.

The emulsifier used in forming the emulsion thickener of the printing paste contains the essential ingredients of about 2 to about 8 percent by weight, preferably from about 3 to about 6 percent by weight of an oxyethylated fatty alcohol having the general formula $$R-CH_2O(C_2H_4O)_n-C_2H_4OH$$

wherein R represents an alkyl radical containing from 6 to 20 carbon atoms, preferably from 6 to 14 carbon atoms and $n$ represents an integer from 1 to 20, preferably from 5 to 15. The oxyethylated fatty alcohols as used herein are known in the art and can be readily prepared by the reaction of ethylene oxide with the appropriate alcohols such as octyl alcohol, nonyl alcohol, decyl alcohol, dodecyl alcohol, octadecyl alcohol and the like.

The oil phase in the emulsion thickener is preferably wholly or substantially wholly volatile and, for reasons of economy, may consist of inexpensive oils of the character of kerosene and other fractions of petroleum or aromatic or naphthenic hydrocarbons, for example, toluene, the xylenes and the like. Mixtures of aromatic and/or naphthenic hydrocarbons with each other or with petroleum hydrocarbons may be used. The amount of hydrocarbon in the emulsion thickener can range from about 52 to about 78 percent by weight, preferably in the range from about 60 to about 72 percent.

An additional ingredient in the emulsion thickener is water which is present in amounts from about 20 to about 40 percent by weight, preferably from about 25 to 35 percent by weight.

The application of the print paste to the polyethylene terephthalate fabric can be made by any convenient method. The paste may be applied by the usual silk screen or roller printing methods. Different colors of paste may be applied to different areas of the fabric with or without overlapping. Conveniently, the paste is applied at room temperature. For best results, the textile fabric should be freed of foreign materials, as by thorough scouring, or scouring and bleaching before the paste is applied. After the paste has been applied, the printed fabric can be dried quickly at elevated temperatures in the range from 100 to 300° F. or higher, if desired.

After the printing paste has been applied to the fabric and dried, the dyestuff within the paste is now fixed by various treatments such as heat setting plus steaming, steaming plus heat setting, or combinations thereof and the like. Such treatments increase the colorfastness of the finished textile product.

The conditions for fixing the dyestuffs can depend on the particular textile fabric being heated, for example, on its weight and construction. In general, when dry heat is used as when the textile fabric is passed through a hot air heater, an infra-red heater or in contact with heated rollers or drums, temperatures in excess of 340° F. or above are employed. Preferably, the printed fabric is heated to a temperature in the range from about 360 to about 430° F. from about 10 to about 80 seconds. With lower temperatures, i.e. below 340° F., the heating time is considerably longer, for example, 5 to 10 minutes or longer. Still lower heat-setting temperatures may be employed when the heat is applied by means of saturated steam under a pressure, for example, 5 to 50 pounds per square inch gauge. The fixing of the prints can be carried out by steaming at atmospheric pressure followed by heat setting.

After heat setting, it is essential to scour the fabric material. Such scouring has been found to reduce any tendency the fabric may have to stain the water used for the first home- or laundry-washing thereof, presumably by the removal of a very small amount of loosely adherent dyestuff. This scouring treatment may be carried out, for example, at a temperature of 120 to 150° F. using an aqueous scouring bath containing 0.5 to 2 grams per liter of a suitable detergent. Following the scouring, finishes may be applied to the fabric and dried.

The following examples will further illustrate the process of the invention without limiting the same:

Example 1

The fabric used for printing was 100 percent polyethylene terephthalate batiste. A printing paste of the proper consistency was made up of 3 percent by weight Eastman Polyester Blue GLF Colour Index No. 60767, 4-para-hydroxyethylanilino-5-nitrochrysazin

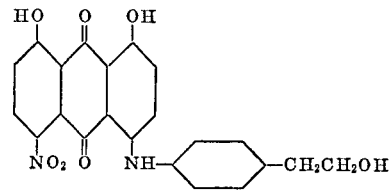

60 percent by weight of sodium alginate [3% dried thickener and remainder water], 4 percent by weight of an oxyethylated dodecyl alcohol having a molecular weight in the range from about 200 to about 400 and the remainder of the paste was water. The printing paste was applied to the fabric in a patterned effect at room temperature. The print was dried at room temperature followed by steaming for 10 minutes at atmospheric pressure followed by heat setting at 380° F. for 20 seconds. This procedure provides a basis for continuous process which avoids a discontinuous steaming operation. The finished fabrics were scoured in water containing the detergents of 2 grams per liter of a non-ionic surfactant at 170° F. for 20 minutes. The prints obtained were sharp and highly desirable.

Example 2

The fabrics used for printing were 100 percent polyethylene terephthalate taffeta and 100 percent polyethylene terephthalate tricot. One part of the material was heat set at 370° F. Heat set and unset fabrics were printed together. No difference in shade between heat set and unset was observed.

The following disperse dyes were printed alone or in combination by each of the procedures used both on unset and heat set fabrics:

(a) The combination 4 percent Cibacet Navy Blue RL Conc., 1 percent Latyl Bordeaux B, and 1 percent Amacron Orange SF, (b) 5 percent Cibacet Navy Blue RL Conc., (c) the combination 4.5 percent Resoline Blue GRL and 0.25 percent Amacron Orange SF and (d) 7 percent Cibacet Printing Black RRHP. Three different printing paste formulas were used for the above disperse dyes which included:

(1) Approximately 33 percent water and 60 percent emulsion thickener having about 4 weight percent of an oxyethylated dodecyl alcohol having a molecular weight in the range from about 200 to about 400, 65 percent by weight kerosene (also can use toluene or xylene) with the remainder water;

(2) Approximately 30 percent water, 43 percent thickening agent and 20 percent dye assistant carrier (an emulsified modified anionic phenol liquid having a neutral pH known in the art as a dye assistant carrier);

(3) Approximately 30 percent water, 43 percent alginate thickening agent and 20 percent dye assistant carrier (a liquid organic phenolic material known in the art as a dye assistant carrier).

The pastes and dyestuff combinations described above were printed on the fabrics. All of the prints were fixed by steaming for 10 minutes at atmospheric pressure followed by heat setting at 380° F. for 20 seconds. The finished fabrics were scoured in water containing the detergents of 2.0 grams per liter of a non-ionic surfactant at 170° F. for 20 minutes.

The printing paste labeled 1 (that of the process of the invention) in combination with all of the above dyestuffs provided smoother and sharper prints than those obtained with the printing pastes with the ingredients labeled 2 and 3, utilizing dye assistant carriers. Similar properties in relation to lightfastness, washfastness, crocking and dry cleaning were obtained with all of the above printing pastes. Similar results were obtained utilizing polyethylene terephthalate blends with cotton, wool, nylon, acrylics, and the like. The advantage of this result is to provide smoother and sharper prints of improved color yield by the process of this invention with the additional advantage of improved economy.

Utilizing the printing pastes described above, the pastes were printed on 100 percent polyethylene terephthalate fabrics, dried, and fixed at 400 to 410° F. for 60 seconds on a continuous printing basis followed by scouring as described above. The prints utilizing the paste of disperse dye and emulsifier labeled (1) above again provided smoother and sharper prints than the dyestuffs and other formulations labeled (2) and (3) and containing dye assistant carriers. Similar properties in relation to lightfastness, washfastness, crocking and dry cleaning were obtained on all of the printing pastes. Heretofore, satisfactory printing of 100 percent polyethylene terephthalate fabrics on a continuous basis required pastes containing expensive dye assistant carriers. It should be noted that in utilizing the process of this invention, an inexpensive emulsion thickener with carrier properties provides smoother and sharper prints over those prints utilizing the expensive dye assistant carriers.

It should be understood that the foregoing detailed description is given merely by way of illustration and that many variations may be made therein without departing from the spirit of the invention.

What is claimed is:

1. An improved process for the production of patterned effects on a polyethylene terephthalate fabric comprising printing on said fabric an aqueous paste having a printing consistency comprising from about 0.1 to about 15 percent of a disperse dye and an emulsion thickener comprising (a) about 2 to about 8 percent by weight of said emulsion thickener of an oxyethylated fatty alcohol having the formula $$R\text{—}CH_2O(C_2H_4O)_n\text{—}C_2H_4OH$$

wherein R represents an alkyl radical containing from 6 to 20 carbon atoms and $n$ represents an integer of from 1 to 20, (b) about 20 to about 40 percent by weight of said emulsion thickener of water and (c) about 52 to about 78 percent by weight of a volatile hydrocarbon liquid selected from the group consisting of kerosene, toluene and xylene; heating said fabric at elevated temperatures for a sufficient period of time to fix said print.

2. The process of claim 1 wherein the elevated temperatures range from about 340° F. to about 430° F.

3. The process of claim 1 wherein the emulsion thickener contains oxyethylated dodecyl alcohol having a molecular weight in the range from 200 to 400.

4. The process of claim 1 wherein the fabric contains 100 percent polyethylene terephthalate.

5. A continuous process for the production of patterned effects on a polyethylene terephthalate fabric comprising printing on said fabric an aqueous paste having a printing consistency comprising from about 0.1 to about 15 percent of a disperse dye and an emulsion thickener comprising (a) about 2 to about 8 percent by weight of said emulsion thickener of an oxyethylated fatty alcohol having the formula $$R\text{—}CH_2O(C_2H_4O)_n\text{—}C_2H_4OH$$

wherein R represents an alkyl radical containing from 6 to 20 carbon atoms and $n$ represents an integer from 1 to 20, (b) about 20 to about 40 percent by weight of said emulsion thickener of water and (c) about 52 to about 78 percent by weight of a volatile hydrocarbon liquid selected from the group consisting of kerosene, toluene and xylene; heating said fabric at elevated temperatures in the range from about 340° F to about 430° F. for a sufficient period of time to fix said print.

6. The process of claim 5 wherein the temperature of said fixing step is in the range from 380 to about 430° F.

7. A continuous process for the production of patterned effects on a polyethylene terephthalate fabric comprising printing on said fabric an aqueous paste having a printing consistency comprising from about 0.1 to about 15 percent of a disperse dye and an emulsion thickener comprising (a) about 3 to 5 percent by weight of said emulsion thickener of an oxyethylated fatty alcohol having the formula $$R\text{—}CH_2O(C_2H_4O)_n\text{—}C_2H_4OH$$

wherein R represents an alkyl radical containing from 6 to 14 carbon atoms and $n$ represents an integer from 5 to 15, (b) about 25 to about 35 percent by weight of said emulsion thickener of water and (c) about 60 to about 72 percent by weight of a volatile hydrocarbon liquid selected from the group consisting of kerosene, toluene and xylene; heating said fabric at temperatures in the range from about 380° F. to about 430° F. for a sufficient period of time to cure and heat set said print.

8. The process of claim 7 wherein the fabric contains 100 percent polyethylene terephthalate.

9. The process of claim 7 wherein the oxyethylated fatty alcohol in the emulsion thickener is an oxyethylated dodecyl alcohol having a molecular weight in the range from about 200 to about 400.

References Cited

UNITED STATES PATENTS 2,828,180    3/1958    Sertorio _____ 8—62

NORMAN G. TORCHIN, *Primary Examiner.*

T. J. HERBERT, JR., *Assistant Examiner.*

U.S. Cl. X.R.

8—93